United States Patent
Shi (10) Patent No.: US 11,569,969 B2
(45) Date of Patent: Jan. 31, 2023

(54) METHOD FOR DOWNLINK BWP ACTIVATION AND DEACTIVATION, AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 37 days.

(21) Appl. No.: 16/915,293

(22) Filed: Jun. 29, 2020

(65) Prior Publication Data

US 2020/0328867 A1   Oct. 15, 2020

Related U.S. Application Data

(63) Continuation of application No. PCT/CN2017/119947, filed on Dec. 29, 2017.

(51) Int. Cl.
| | |
|---|---|
| *H04L 5/00* | (2006.01) |
| *H04W 72/04* | (2009.01) |
| *H04W 76/11* | (2018.01) |
| *H04W 76/38* | (2018.01) |
| *H04W 74/08* | (2009.01) |

(52) U.S. Cl.
CPC .......... *H04L 5/0098* (2013.01); *H04L 5/0092* (2013.01); *H04W 72/042* (2013.01); *H04W 72/0466* (2013.01); *H04W 74/0833* (2013.01); *H04W 76/11* (2018.02); *H04W 76/38* (2018.02)

(58) Field of Classification Search
None
See application file for complete search history.

(56) References Cited

U.S. PATENT DOCUMENTS

| 2011/0150249 | A1 | 6/2011 | Klemmensen | |
|---|---|---|---|---|
| 2011/0243106 | A1 | 10/2011 | Hsu | |
| 2012/0026913 | A1 | 2/2012 | Reznik | |
| 2012/0300715 | A1* | 11/2012 | Pelletier | H04W 74/0891 370/329 |
| 2012/0327885 | A1* | 12/2012 | Chung | H04L 1/1671 370/329 |

(Continued)

FOREIGN PATENT DOCUMENTS

| CN | 101583196 A | 11/2009 |
|---|---|---|
| CN | 103597765 A | 2/2014 |

(Continued)

OTHER PUBLICATIONS

Vivo. "Discussion on the activation/deactivation of the bandwidth part" 3GPP TSG RAN WG1 Meeting#90 R1-1712870, Aug. 25, 2017(Aug. 25, 2017), sections 1 and 2.

(Continued)

*Primary Examiner* — Edan Orgad
*Assistant Examiner* — Emmanuel K Maglo
(74) *Attorney, Agent, or Firm* — Perkins Coie LLP (57) ABSTRACT

A method for downlink bandwidth part (BWP) activating and deactivating and a terminal device are provided. The method comprises: the terminal device performs, based on control of a network side, activation and deactivation to at least one downlink BWP configured on a carrier.

6 Claims, 2 Drawing Sheets

---

101 — Activation and deactivation to at least one downlink BWP configured on a carrier of a terminal device is performed 102 — The activation and deactivation to the at least one downlink BWP configured on the carrier is performed based on control of a network side

(56) References Cited

U.S. PATENT DOCUMENTS

| | | | |
|---|---|---|---|
| 2013/0176952 A1* | 7/2013 | Shin | H04W 72/042 |
| | | | 370/329 |
| 2014/0050169 A1 | 2/2014 | Li et al. | |
| 2014/0146779 A1 | 5/2014 | Hsu et al. | |
| 2014/0177607 A1 | 6/2014 | Li et al. | |
| 2017/0118054 A1 | 4/2017 | Ma et al. | |
| 2018/0007707 A1* | 1/2018 | Rico Alvarino | H04W 28/02 |
| 2018/0206214 A1* | 7/2018 | Bendlin | H04W 72/042 |
| 2019/0059129 A1* | 2/2019 | Luo | H04W 72/042 |
| 2019/0103954 A1* | 4/2019 | Lee | H04W 72/042 |
| 2019/0150064 A1* | 5/2019 | Chen | H04W 48/10 |
| | | | 370/328 |
| 2019/0289513 A1* | 9/2019 | Jeon | H04W 72/0453 |
| 2020/0170038 A1* | 5/2020 | Park | H04L 27/26 |
| 2020/0228287 A1 | 7/2020 | Lou et al. | |
| 2020/0288494 A1* | 9/2020 | Heo | H04W 72/1284 |
| 2020/0288502 A1* | 9/2020 | Lee | H04W 24/08 |

FOREIGN PATENT DOCUMENTS

| | | |
|---|---|---|
| CN | 107211451 A | 9/2017 |
| EP | 3225070 A1 | 10/2017 |
| EP | 3687093 A1 | 7/2020 |
| WO | 2010054378 A1 | 5/2010 |
| WO | 2014116928 A1 | 7/2014 |
| WO | 2017067522 A1 | 4/2017 |

OTHER PUBLICATIONS

Guangdong Oppo Mobile Telecom. "Remaining issues on bandwidth part configuration and activation" 3GPP TSG RAN WG1 Meeting #90 R1-1713266, Aug. 25, 2017(Aug. 25, 2017), section 1.

Huawei et al. "Bandwidth part activation and adaptation" 3GPP TSG RAN WG1 Meeting #90 R1-1712155, Aug. 25, 2017(Aug. 25, 2017). sections 1 and 2.

International Search Report in the international application No. PCT/CN2017/119947, dated Sep. 20, 2018.

LG Electronics Inc., Summary of E-mail discussion on [99bis#43][NR UP/MAC] Impact of BWP, Discussion and Decision, 3GPP TSG-RAN WG2 Meeting #100 R2-1713879, Nov. 27-Dec. 1, 2017.

Vivo: "Other aspects on bandwidth Parts", 3GPP Draft; R1-1719800 BWP Final, 3rd Generation Partnership Project (3GPP), Mobile Competence Centre; 650, Route Deslucioles: F-06921 Sophia-Antipolis Cedex; France vol. RAN WG1, no. Reno, USA; Nov. 27, 2017-Dec. 1, 2017, Nov. 18, 2017 (Nov. 18, 2017), XP051369543, Retrieved from the Internet: URL: http://www.3gpp.org/ftp/tsg%5Fran/WG1%5FRL1/TSGR1%5F91/Docs/ [ retrieved on Nov. 18, 2017]Sections 2, 3.

Vivo: "Remaining details for bandwidth part operation", 3GPP Draft: R1-1717504 Remaining Details for Bandwidth Part Operation, 3rd Generation Partnership Project (3GPP), Mobile Competence Centre; 650, Route Des Lucioles ; F-06921 Sophia-Anti Polis Cedex vol. RAN WG1, no. Prague, CZ; Oct. 9, 2017-Oct. 13, 2017, Oct. 8, 2017 (Oct. 8, 2017), XP051340692, Retrieved from the Internet: URL: http://www.3gpp.org/ftp/Meetings 3GPP SYNC/RAN1/Docs/ [ retrieved on Oct. 8, 2017] Section 2.2.

Samsung: "Activation/deactivation of bandwidth parts in NR", 3GPP Draft: R2-1711189 Activation Deactivation of Bandwidth Part in NR R2. 3rd Generation Partnership Project (3GPP), Mobile Competence Centre; 650, Route Des Lucioles ; F-06921 Sophia-Antipolis Cede, vol. RAN WG2, no. Prague, Czech; Oct. 9, 2017-Oct. 13, 2017, Oct. 8, 2017 (Oct. 8, 2017), XP051343196, Retrieved from the Internet: URL: http://www.3gpp.org/ftp/Meetings 3GPP SYNC/RAN2/Docs/ [ retrieved on Oct. 8, 2017] Section 1.

Ericsson: "Summary of 7.3.1.4 (DCI contents and formats)", 3GPP Draft; R1-1721355 Summary of 7.3.1.4 (DCI Content), 3rd Generation Partnership Project (3GPP), Mobile Competence Centre ; 650, Route Des Lucioles: F-06921 Sophia-Antipolis Cedex: France vol. RAN WG1, no. Reno, NV, US; Nov. 27, 2017-Dec. 1, 2017, Nov. 28, 2017 (Nov. 28, 2017), XP051363847, Retrieved from the Internet: URL: http://www.3gpp.org/ftp/Meetings%5F3GPP%5FSYNC/RAN1/Docs/ [ retrieved on Nov. 28, 2017] Sections 7, 8.

Huawei et al: "Offline discussion for BWP", 3GPP Draft: R2-1714182 Offline Discussion on BWP, 3rd Generation Partnership Project(3GPP), Mobile Competence Centre ; 650, Route Des Lucioles ; F-06921 Sophia-Antipolis Cedex: France vol. RAN WG2, no. Reno, USA; Nov. 27, 2017-Dec. 1, 2017, Dec. 4, 2017 (Dec. 4, 2017), XP051372814, Retrieved from the Internet: URL: http://www.3gpp.org/ftp/tsg%5Fran/WG2%5FRL2/TSGR2%5F100/Docs/ [ retrieved on Dec. 4, 2017] Sections 1 and 2.7.

Supplementary European Search Report in the European application No. 17936746.1, dated Sep. 28, 2020.

Written Opinion of the International Search Authority in the international application No. PCT/CN2017/119947, dated Sep. 20, 2018.

First Office Action of the European application No. 17936746.1, dated Jul. 8, 2021. 7 pages.

First Office Action of the Chinese application No. 202010803452.9, dated Sep. 17, 2021. 15 pages with English translation.

First Office Action of the Chinese application No. 201580074377.4, dated Apr. 3, 2020. 23 pages with English translation.

First Office Action of the Japanese application No. 2020-535214, dated Jan. 7, 2022. 6 pages with English translation.

Second Office Action of the Chinese application No. 202010803452.9, dated Dec. 6, 2021. 15 pages with English translation.

\* cited by examiner

METHOD FOR DOWNLINK BWP ACTIVATION AND DEACTIVATION, AND TERMINAL DEVICE

CROSS-REFERENCE TO RELATED APPLICATIONS

The application is a continuation application of PCT Application No. PCT/CN2017/119947 filed on Dec. 29, 2017, the disclosure of which is incorporated by reference herein in its entity.

BACKGROUND

A system bandwidth supported in New Radio (NR) is far greater than a maximum system bandwidth 20 MHz supported in Long Term Evolution (LTE). Some terminals may not be able to support the entire system bandwidth because of limited capabilities. For improving scheduling efficiency, the concept of bandwidth part (BWP) is introduced in NR. In a Radio Resource Control (RRC) connected state, a network may configure one or more BWPs for a terminal. The BWP mainly includes three parameters: numerology, center frequency and bandwidth.

It can be seen that BWP is a concept in a frequency-domain dimension. In addition, there is made such a hypothesis in existing discussions that a terminal supports only one activated BWP at a time point. Activation means that the terminal expects to receive, on a bandwidth specified by the BWP, signals including data transmission (uplink and downlink), a system message and the like. However, at present, there is no specification on how to control activation and the like of a BWP for a terminal device side.

SUMMARY

The disclosure relates to the field of information processing technologies, embodiments of the disclosure provide a method for downlink BWP activation and deactivation and a terminal device.

In a first aspect, the embodiments of the disclosure provide a method for downlink BWP activation and deactivation, which may be applied to a terminal device and may include the following operation.

Activation and deactivation to at least one downlink BWP configured on a carrier is performed based on control of a network side.

In a second aspect, the embodiments of the disclosure provide a terminal device, which may include a processor.

The processor is configured to perform, based on control of a network side, activation and deactivation to at least one downlink BWP configured on a carrier.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

First Embodiment

The embodiment of the disclosure provides a method for downlink BWP activation and deactivation, which is applied to a network device and includes that: the network device performs activation and deactivation to at least one downlink BWP configured on a carrier of a terminal device.

In addition, whether the downlink BWP is initially in an active state or not, which includes: the downlink BWP is controlled to be in the active state at the initial time, or, the downlink BWP is controlled to be in an inactive state at the initial time.

Whether the downlink BWP is initially in an active state or not, which also includes: at least one initial BWP is configured among the at least one downlink BWP configured for the terminal device, and the initial BWP is configured to be in the active state by default; and other downlink BWPs, except the initial BWP, of the at least one downlink BWP configured for the terminal device are configured to be in the inactive state by default. Specifically, one or more downlink BWPs are configured on a carrier of the terminal device, and a network may activate or deactivate the configured BWPs. There is an initial BWP configured by the network, among the one or more configured BWPs; the initial BWP is in the active state by default (i.e., when the carrier where the BPWs are located is activated, the initial BWP is required to be additionally activated); and other configured BWPs except the initial BWP are configured to be in the inactive state by default.

Furthermore, in the embodiment, activation and deactivation is performed by one of the following manners.

A first manner: activation and deactivation of at least one downlink BWP is controlled through a media access control (MAC) control element (CE), i.e., a downlink BWP activation and deactivation MAC CE.

A second manner: activation and deactivation of at least one downlink BWP is controlled through downlink control information (DCI), i.e., downlink BWP activation DCI.

A third manner: an activation and deactivation time rule is configured for the terminal device to control an activation and deactivation instruction of at least one downlink BWP, i.e., a preconfigured time pattern.

A fourth manner: an inactivity timer corresponding to a downlink BWP is configured for the downlink BWP to control deactivation of the downlink BWP, i.e., a downlink BWP-specific inactivity timer, and when the inactivity timer expires, the downlink BWP corresponding to the inactivity timer is deactivated.

The abovementioned manners will be described below respectively.

The first manner: the MAC CE includes a bitmap corresponding to the at least one downlink BWP; and based on each bit in the bitmap, activation or deactivation of the BWP corresponding to the bit is controlled.

A method for correspondence between the MAC CE and the BWP may be as follows: the downlink BWP activation and deactivation MAC CE is a MAC CE including a bitmap corresponding to indexes of the one or more configured BWPs.

Here, activation or deactivation of the BWP corresponding to the bit is controlled based on the bit, which includes:

the bit in the bitmap is set to be 1 or 0 to represent activation or deactivation of the BWP corresponding to the bit.

The second manner: an index is added into the DCI, and a BWP to be activated is indicated through the index.

Specifically, the DCI is carried on a physical downlink control channel (PDCCH) scrambled with a cell radio network temporary identifier (C-RNTI), or the DCI is carried on a PDCCH scrambled with a special radio network temporary identifier (RNTI). The downlink BWP activation DCI is DCI carried on the PDCCH scrambled with the C-RNTI or the special RNTI (e.g., a BWP activation RNTI). The indexes of one or more BWPs to be activated among the configured BWPs are added into the DCI.

Furthermore, when the DCI is carried on the PDCCH scrambled with the C-RNTI, downlink transmission on the BWP to be activated is scheduled on the downlink BWP in an active state. When the DCI is carried on the PDCCH scrambled with the C-RNTI, downlink transmission on the BWP to be activated is scheduled on the presently activated downlink BWP to activate the downlink BWP to be activated.

The third manner: activation switching of the at least one downlink BWP on the carrier is controlled based on the activation and deactivation time rule.

The activation and deactivation time rule is a preconfigured time pattern, and means that different BWPs are activated according to a certain time rule.

For example, there are three BWPs, i.e., BWP1, BWP2 and BWP3. The activation switching of the at least one downlink BWP on the carrier is controlled based on the activation and deactivation time rule, which includes: different configured BWPs are periodically switched to the active state, for example, [BWP1, BWP2, BWP3].

The activation switching of the at least one downlink BWP on the carrier is controlled based on the activation and deactivation time rule, which also includes: a radio frame is configured, and at least one subframe of the radio frame is divided into at least one subframe group, each subframe group is configured to instruct activation of a respective downlink BWP. For example, there are still three BWPs, and there is made such a hypothesis that in a configured radio frame (including 10 subframes of which each has 1 ms), subframes 0~3 instruct activation of BWP1, subframes 4~6 instruct activation of BWP2, and 7~9 instruct activation of BWP3.

The activation switching of the at least one downlink BWP on the carrier is controlled based on the activation and deactivation time rule, which also includes: for each downlink BWP, a starting time from which the downlink BWP is in an active state and a duration during which the downlink BWP is in the active are configured.

That is, the starting time from which each BWP is in the active state and the duration during which the BWP is in the active state are configured, and different activated BWPs may overlap in time.

The fourth manner: at least one inactivity timer is configured for at least part of other downlink BWPs, except an initial BWP, of the at least one downlink BWP; and durations, during which the other downlink BWPs except the initial BWP are kept in an active state after entering the active state, are controlled through the at least one inactivity timer.

The at least one downlink BWP inactivity timer is configured for the at least part of other configured downlink BWPs except the initial BWP. The at least part of downlink BWPs include one or more downlink BWPs. Moreover, configuration of the timer includes: one timer is configured for the at least part of downlink BWPs, or, a different timer is configured for each downlink BWP among the at least part of downlink BWPs.

The timer specifies a duration during which a configured BWP is kept in the active state after being activated, and behaviors of the timer include as follows.

A starting or restarting condition is as follows.

The timer is started or restarted upon activation of the BWP corresponding to the timer when an activation instruction for the BWP is received or the time pattern is reached.

The timer is started or restarted when a scheduling indication corresponding to timer is received on the BWP or data transmission or reception occurred on the BWP corresponding to timer.

A stopping condition is that the terminal device initiates a random access procedure.

After the timer expires, the BWP corresponding to the timer is deactivated; and if only one BWP is currently in the active state, the terminal device returns to a default BWP or the initial BWP.

It can be seen that with adoption of the above solution, it is possible to determine activation or deactivation of the at least one downlink BWP configured on the carrier of the terminal device, so that the problem of how to control active and inactive states of part of multiple downlink BWPs when the multiple downlink BWPs are configured on the carrier is solved.

Second Embodiment

The embodiment of the disclosure provides a method for downlink BWP activation and deactivation, which is applied to a terminal device and includes that: the terminal device performs, based on control of a network side, activation and deactivation to at least one downlink BWP configured on a carrier.

In addition, whether the downlink BWP is initially in an active state or not, which includes: the downlink BWP is controlled to be in the active state at the initial time, or, the downlink BWP is controlled to be in an inactive state at the initial time.

Whether the downlink BWP is initially in an active state or not, which also includes: at least one initial BWP is configured among the at least one downlink BWP configured for the terminal device, and the initial BWP is configured to be in the active state by default; and other downlink BWPs, except the initial BWP, of the at least one downlink BWP configured for the terminal device are configured to be in the inactive state by default. Specifically, one or more downlink BWPs are configured on a carrier of the terminal device, and a network may activate or deactivate the configured BWPs. There is an initial BWP configured by the network, among the one or more configured BWPs; the initial BWP is in the active state by default (i.e., when the carrier where the BPWs are located is activated, the initial BWP is required to be additionally activated); and other configured BWPs except the initial BWP are configured to be in the inactive state by default.

Furthermore, in the embodiment, activation and deactivation is performed by one of the following manners.

A first manner: activation and deactivation of at least one downlink BWP is controlled through information of a Media Access Control (MAC) Control Element (CE).

A second manner: activation and deactivation of at least one downlink BWP is controlled through Downlink Control Information (DCI), i.e., downlink BWP activation DCI.

A third manner: an activation and deactivation time rule is configured for the terminal device to control an activation and deactivation instruction of at least one downlink BWP, i.e., a preconfigured time pattern.

A fourth manner: an inactivity timer corresponding to a downlink BWP is configured for the downlink BWP to control deactivation of the downlink BWP, i.e., a downlink BWP-specific inactivity timer, and when the inactivity timer expires, the downlink BWP corresponding to the inactivity timer is deactivated.

The abovementioned manners will be described below respectively.

The first manner: the MAC CE includes a bitmap corresponding to the at least one downlink BWP; and based on each bit in the bitmap, activation or deactivation of the BWP corresponding to the bit is controlled.

A method for correspondence between the MAC CE and the BWP may be as follows: the downlink BWP activation and deactivation MAC CE is a MAC CE including a bitmap corresponding to indexes of the one or more configured BWPs.

Here, activation or deactivation of the BWP corresponding to the bit is controlled based on the bit, which includes: the bit in the bitmap is set to be 1 or 0 to represent activation or deactivation of the BWP corresponding to the bit.

The second manner: a BWP to be activated indicated by the network side is determined based on an index in the DCI.

Specifically, the DCI is carried on a physical downlink control channel (PDCCH) scrambled with a cell radio network temporary identifier (C-RNTI), or the DCI is carried on a PDCCH scrambled with a special radio network temporary identifier (RNTI). The downlink BWP activation DCI is DCI carried on the PDCCH scrambled with the C-RNTI or the special RNTI (e.g., a BWP activation RNTI). The indexes of one or more BWPs to be activated among the configured BWPs are added into the DCI.

Furthermore, when the DCI is carried on the PDCCH scrambled with the C-RNTI, downlink transmission on the BWP to be activated is acquired on the downlink BWP in an active state. When the DCI is carried on the PDCCH scrambled with the C-RNTI, downlink transmission on the BWP to be activated is scheduled on the presently activated downlink BWP to activate the downlink BWP to be activated.

The third manner: activation switching of the at least one downlink BWP on the carrier is determined based on the activation and deactivation time rule.

The activation and deactivation time rule is a preconfigured time pattern, and means that different BWPs are activated according to a certain time rule.

For example, there are three BWPs, i.e., BWP1, BWP2 and BWP3. The activation switching of the at least one downlink BWP on the carrier is determined based on the activation and deactivation time rule, which includes: different configured BWPs are periodically switched to the active state, for example, [BWP1, BWP2, BWP3].

The activation switching of the at least one downlink BWP on the carrier is determined based on the activation and deactivation time rule, which also includes: at least one subframe group into which at least one subframe of a radio frame is divided is acquired; it is determined, based on instruction information of each subframe group, whether to activate the downlink BWP corresponding to the subframe group, here, each subframe group is configured to instruct activation of a respective downlink BWP. For example, there are still three BWPs, and there is made such a hypothesis that in a configured radio frame (including 10 subframes of which each has 1 ms), subframes 0~3 instruct activation of BWP1, subframes 4~6 instruct activation of BWP2, and 7~9 instruct activation of BWP3.

The activation switching of the at least one downlink BWP on the carrier is determined based on the activation and deactivation time rule, which also includes: a starting time from which each downlink BWP is in an active state and a duration during which the downlink BWP is in the active are acquired, the starting time and the duration are configured for the downlink BWP.

That is, the starting time from which each BWP is in the active state and the duration during which the BWP is in the active state are configured, and different activated BWPs may overlap in time.

The fourth manner: at least one inactivity timer is configured for at least part of other downlink BWPs, except an initial BWP, of the at least one downlink BWP are acquired; and durations, during which the at least part of other downlink BWPs are kept in an active state after entering the active state, are controlled through the at least one inactivity timer.

The at least one downlink BWP inactivity timer is configured for the at least part of other configured downlink BWPs except the initial BWP. The at least part of downlink BWPs include one or more downlink BWPs. Moreover, configuration of the timer includes: one timer is configured for the at least part of downlink BWPs, or, a different timer is configured for each downlink BWP among the at least part of downlink BWPs.

The timer specifies a duration during which a configured BWP is kept in the active state after being activated, and behaviors of the timer include as follows.

The inactivity timer corresponding to a downlink BWP is started when the downlink BWP enters the active state according to a received activation instruction or it is determined based on a corresponding time rule that the downlink BWP enters the active state. That is, the timer is started or restarted upon activation of the BWP corresponding to the timer when the activation instruction for the BWP is received or the time pattern arrives.

The inactivity timer corresponding to a downlink BWP is started when a scheduling indication is received on the downlink BWP or data transmission or reception occurred on the downlink BWP. That is, the inactivity timer corresponding to the downlink BWP is started when the scheduling indication is received on the BWP or data transmission or reception occurred on the BWP.

A stopping condition is that the inactivity timer is controlled to be stopped when the terminal device initiates a random access procedure.

When the inactivity timer corresponding to a downlink BWP expires, the downlink BWP is controlled to be switched to the inactivity state; and the number of downlink BWPs presently in the active state is detected, and when the number of the downlink BWPs is 1, the downlink BWP presently in the active state is controlled to be replaced with the initial BWP to activate the initial BWP and deactivate the downlink BWP presently in the active state. That is, after the timer expires, the BWP corresponding to the timer is deactivated, and if there is only one activated BWP at present, the terminal device returns to a default BWP or the initial BWP.

Figure 1:
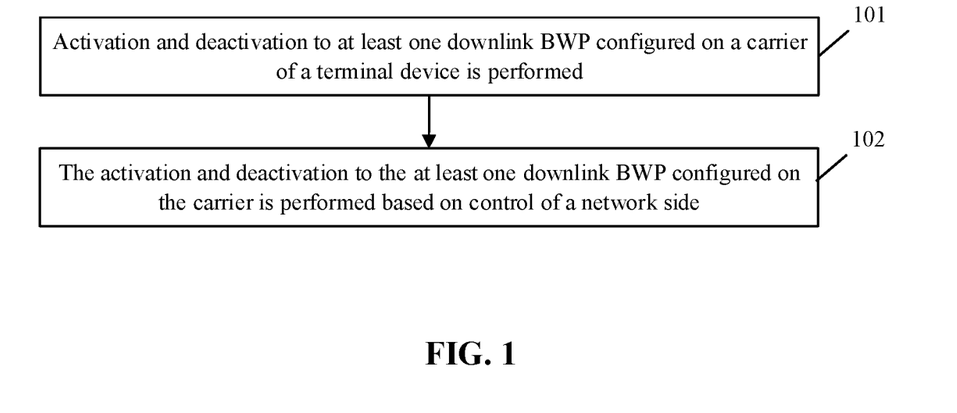
FIG. 1 is a flowchart of a method for downlink BWP activation and deactivation according to an embodiment of the disclosure.

A processing flow of the disclosure is provided in combination with the two abovementioned embodiments. As illustrated in FIG. 1, the flow includes the following operations.

In 101, activation and deactivation to at least one downlink BWP configured on a carrier of a terminal device is performed.

In 102, the activation and deactivation to the at least one downlink BWP configured on the carrier is performed based on control of a network side.

It can be seen that with adoption of the above solution, it is possible to determine activation or deactivation of the at least one downlink BWP configured on the carrier of the terminal device, so that the problem of how to control active and inactive states of part of multiple downlink BWPs when the multiple downlink BWPs are configured on the carrier is solved.

Third Embodiment

Figure 2:
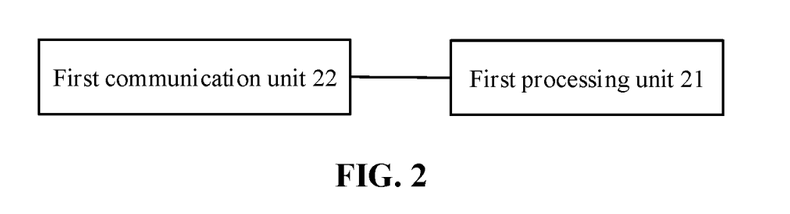
FIG. 2 is a composition structure diagram of a network device according to an embodiment of the disclosure.

The embodiment of the disclosure provides a network device, as illustrated in FIG. 2, includes a first processing unit 21 which is configured to perform activation and deactivation to at least one downlink BWP configured on a carrier of a terminal device.

In addition, whether the downlink BWP is initially in an active state or not, which includes: the downlink BWP is controlled to be in the active state at the initial time, or, the downlink BWP is controlled to be in an inactive state at the initial time.

Whether the downlink BWP is initially in an active state or not, which also includes: at least one initial BWP is configured among the at least one downlink BWP configured for the terminal device, and the initial BWP is configured to be in the active state by default; and other downlink BWPs, except the initial BWP, of the at least one downlink BWP configured for the terminal device are configured to be in the inactive state by default. Specifically, one or more downlink BWPs are configured on a carrier of the terminal device, and a network may activate or deactivate the configured BWPs. There is an initial BWP configured by the network, among the one or more configured BWPs; the initial BWP is in the active state by default (i.e., when the carrier where the BPWs are located is activated, the initial BWP is required to be additionally activated); and other configured BWPs except the initial BWP are configured to be in the inactive state by default.

Furthermore, in the embodiment, activation and deactivation is performed by one of the following manners.

A first manner: activation and deactivation of at least one downlink BWP is controlled through a Media Access Control (MAC) Control Element (CE), i.e., a downlink BWP activation and deactivation MAC CE.

A second manner: activation and deactivation of at least one downlink BWP is controlled through Downlink Control Information (DCI), i.e., downlink BWP activation DCI.

A third manner: an activation and deactivation time rule is configured for the terminal device to control an activation and deactivation instruction of at least one downlink BWP, i.e., a preconfigured time pattern.

A fourth manner: an inactivity timer corresponding to a downlink BWP is configured for the downlink BWP to control deactivation of the downlink BWP, i.e., a downlink BWP-specific inactivity timer, and when the inactivity timer expires, the downlink BWP corresponding to the inactivity timer is deactivated.

The abovementioned manners will be described below respectively.

The first manner: the MAC CE includes a bitmap corresponding to the at least one downlink BWP, the first processing unit 21 is configured to control, based on each bit in the bitmap, activation or deactivation of the BWP corresponding to the bit.

A method for correspondence between the MAC CE and the BWP may be as follows: the downlink BWP activation and deactivation MAC CE is a MAC CE including a bitmap corresponding to indexes of the one or more configured BWPs.

Here, activation or deactivation of the BWP corresponding to the bit is controlled based on the bit, which includes: the bit in the bitmap is set to be 1 or 0 to represent activation or deactivation of the BWP corresponding to the bit.

The second manner: the first processing unit 21 is configured to add an index into the DCI, and indicate a BWP to be activated through the index.

Specifically, the DCI is carried on a physical downlink control channel (PDCCH) scrambled with a cell radio network temporary identifier (C-RNTI), or the DCI is carried on a PDCCH scrambled with a special radio network temporary identifier (RNTI). The downlink BWP activation DCI is DCI carried on the PDCCH scrambled with the C-RNTI or the special RNTI (e.g., a BWP activation RNTI). The indexes of one or more BWPs to be activated among the configured BWPs are added into the DCI.

Furthermore, the network device further includes a first communication unit 22.

The first communication unit 22 is configured to schedule, on the downlink BWP in an active state, downlink transmission on the BWP to be activated.

The first processing unit 21 is configured to: when the DCI is carried on the PDCCH scrambled with the C-RNTI, schedule, on the downlink BWP in the active state, the downlink transmission on the BWP to be activated through the first communication unit.

When the DCI is carried on the PDCCH scrambled with the C-RNTI, downlink transmission on the BWP to be activated is scheduled on the presently activated downlink BWP to activate the downlink BWP to be activated.

The third manner: the first processing unit 21 is configured to control, based on the activation and deactivation time rule, activation switching of the at least one downlink BWP on the carrier.

The activation and deactivation time rule is a preconfigured time pattern, and means that different BWPs are activated according to a certain time rule.

For example, there are three BWPs, i.e., BWP1, BWP2 and BWP3. The first processing unit is configured to periodically switch different configured BWPs to the active state, for example, [BWP1, BWP2, BWP3].

The first communication unit 22 is configured to configure a radio frame, and divide at least one subframe of the radio frame into at least one subframe group, here, each subframe group is configured to instruct activation of a respective downlink BWP. For example, there are still three BWPs, and there is made such a hypothesis that in a configured radio frame (including 10 subframes of which each has 1 ms), subframes 0~3 instruct activation of BWP1, subframes 4~6 instruct activation of BWP2, and 7~9 instruct activation of BWP3.

The first processing unit 21 is configured to configure, for each downlink BWP, a starting time from which the downlink BWP is in an active state and a duration during which the downlink BWP is in the actived.

That is, the starting time from which each BWP is in the active state and the duration during which the BWP is in the active state are configured, and different activated BWPs may overlap in time.

The fourth manner: the first processing unit 21 is configured to configure at least inactivity timer corresponding to at least part of other downlink BWPs, except an initial BWP, of the at least one downlink BWP; and control, through the at least one inactivity timer, durations during which the other downlink BWPs except the initial BWP are kept in an active state after entering the active state.

The at least one downlink BWP inactivity timer is configured for the at least part of other configured downlink BWPs except the initial BWP. The at least part of downlink BWPs include one or more downlink BWPs. Moreover, configuration of the timer includes: one timer is configured for the at least part of downlink BWPs, or, a different timer is configured for each downlink BWP among the at least part of downlink BWPs.

It can be seen that with adoption of the above solution, it is possible to determine activation or deactivation of the at least one downlink BWP configured on the carrier of the terminal device, so that the problem of how to control active and inactive states of part of multiple downlink BWPs when the multiple downlink BWPs are configured on the carrier is solved.

Fourth Embodiment

Figure 3:
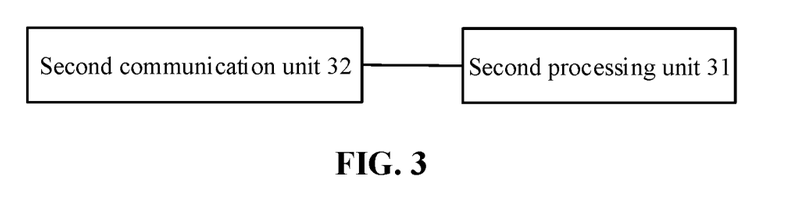
FIG. 3 is a composition structure diagram of a terminal device according to an embodiment of the disclosure.

The embodiment of the disclosure provides a terminal device, as illustrated in FIG. 3, includes a second processing unit 31 which is configured to perform, based on control of a network side, activation and deactivation to at least one downlink BWP configured on a carrier.

In addition, whether the downlink BWP is initially in an active state or not, which includes: the downlink BWP is controlled to be in the active state at the initial time, or, the downlink BWP is controlled to be in an inactive state at the initial time.

Whether the downlink BWP is initially in an active state or not, which also includes: at least one initial BWP is configured among the at least one downlink BWP configured for the terminal device, and the initial BWP is configured to be in the active state by default; and other downlink BWPs, except the initial BWP, of the at least one downlink BWP configured for the terminal device are configured to be in the inactive state by default. Specifically, one or more downlink BWPs are configured on a carrier of the terminal device, and a network may activate or deactivate the configured BWPs. There is an initial BWP configured by the network, among the one or more configured BWPs; the initial BWP is in the active state by default (i.e., when the carrier where the BPWs are located is activated, the initial BWP is required to be additionally activated); and other configured BWPs except the initial BWP are configured to be in the inactive state by default.

Furthermore, in the embodiment, activation and deactivation is performed by one of the following manners.

A first manner: activation and deactivation of at least one downlink BWP is controlled through information of a Media Access Control (MAC) Control Element (CE).

A second manner: activation and deactivation of at least one downlink BWP is controlled through Downlink Control Information (DCI), i.e., downlink BWP activation DCI.

A third manner: an activation and deactivation time rule is configured for the terminal device to control an activation and deactivation instruction of at least one downlink BWP, i.e., a preconfigured time pattern.

A fourth manner: an inactivity timer corresponding to a downlink BWP is configured to control deactivation of the downlink BWP, i.e., a downlink BWP-specific inactivity timer, and when the inactivity timer expires, the downlink BWP corresponding to the inactivity timer is deactivated.

The abovementioned manners will be described below respectively.

The first manner: the terminal device further includes a second communication unit 32, configured to receive the MAC CE. The second processing unit 31 is configured to acquire a bitmap corresponding to the at least one downlink BWP from the MAC CE; and determine, based on each bit in the bitmap, activation or deactivation of the BWP corresponding to the bit.

A method for correspondence between the MAC CE and the BWP may be as follows: the downlink BWP activation and deactivation MAC CE is a MAC CE including a bitmap corresponding to indexes of the one or more configured BWPs.

Here, activation or deactivation of the BWP corresponding to the bit is controlled based on the bit, which includes: the bit in the bitmap is set to be 1 or 0 to represent activation or deactivation of the BWP corresponding to the bit.

The second manner: the second processing unit 31 is configured to determine, based on an index in the DCI, a BWP to be activated indicated by the network side.

Specifically, the DCI is carried on a physical downlink control channel (PDCCH) scrambled with a cell radio network temporary identifier (C-RNTI), or the DCI is carried on a PDCCH scrambled with a special radio network temporary identifier (RNTI). The downlink BWP activation DCI is DCI carried on the PDCCH scrambled with the C-RNTI or the special RNTI (e.g., a BWP activation RNTI). The indexes of one or more BWPs to be activated among the configured BWPs are added into the DCI.

Furthermore, when the DCI is carried on the PDCCH scrambled with the C-RNTI, downlink transmission on the BWP to be activated is acquired on the downlink BWP in an active state. When the DCI is carried on the PDCCH scrambled with the C-RNTI, downlink transmission on the BWP to be activated is scheduled on the presently activated downlink BWP to activate the downlink BWP to be activated.

The third manner: the second processing unit 31 is configured to determine, based on the activation and deactivation time rule, activation switching of the at least one downlink BWP on the carrier.

The activation and deactivation time rule is a preconfigured time pattern, and means that different BWPs are activated according to a certain time rule.

For example, there are three BWPs, i.e., BWP1, BWP2 and BWP3. The second processing unit 31 is configured to periodically switch different configured BWPs to the active state, for example, [BWP1, BWP2, BWP3].

The second processing unit 31 is configured to acquire at least one subframe group into which at least one subframe of a radio frame is divided; and determine, based on instruction information of each subframe group, whether to activate the downlink BWP corresponding to the subframe group, here, each subframe group is configured to instruct activation of a respective downlink BWP. For example, there are still three BWPs, and there is made such a hypothesis that in a configured radio frame (including 10 subframes of which each has 1 ms), subframes 0~3 instruct activation of BWP1, subframes 4~6 instruct activation of BWP2, and 7~9 instruct activation of BWP3.

The second processing unit 31 is configured to acquire a starting time from which each downlink BWP is in an active state and a duration during which the downlink BWP is in the active state, the starting time and the duration are configured for the downlink BWP.

That is, the starting time from which each BWP is in the active state and the duration during which the BWP is in the active state are configured, and different activated BWPs may overlap in time.

The fourth manner: the second processing unit is configured to acquire at least one inactivity timer configured for at least part of other downlink BWPs, except an initial BWP, of the at least one downlink BWP; and control, through the at least one inactivity timer, durations during which the at least part of other downlink BWPs are kept in an active state after entering the active state.

The at least one downlink BWP inactivity timer is configured for the at least part of other configured downlink BWPs except the initial BWP. The at least part of downlink BWPs include one or more downlink BWPs. Moreover, configuration of the timer includes: one timer is configured for the at least part of downlink BWPs, or, a different timer is configured for each downlink BWP among the at least part of downlink BWPs.

The timer specifies a duration during which a configured BWP is kept in the active state after being activated, and behaviors of the timer include as follows.

The second processing unit is configured to start the inactivity timer corresponding to a downlink BWP when the downlink BWP enters the active state according to a received activation instruction or enters the active state based on a corresponding time rule. That is, the timer is started or restarted upon activation of the BWP corresponding to the timer when the activation instruction for the BWP is received or the time pattern arrives.

The second processing unit is configured to start the inactivity timer corresponding to a downlink BWP when a scheduling indication is received on the downlink BWP or data transmission or reception occurred on the downlink BWP. That is, the inactivity timer corresponding to the downlink BWP is started when the scheduling indication is received on the BWP or data transmission or reception occurred on the BWP.

A stopping condition is that the inactivity timer is controlled to be stopped when the terminal device initiates a random access procedure.

The second processing unit is configured to: when the inactivity timer corresponding to a downlink BWP expires, control the downlink BWP to be switched to the inactivity state; and detect the number of downlink BWPs presently in the active state, and when the number of the downlink BWPs is 1, control the downlink BWP presently in the active state to be replaced with the initial BWP to activate the initial BWP and deactivate the downlink BWP presently in the active state. That is, after the timer expires, the BWP corresponding to the timer is deactivated, and if there is only one activated BWP at present, the terminal device returns to a default BWP or the initial BWP.

It can be seen that with adoption of the solution, the at least one downlink BWP configured on the carrier of the terminal device may be determined to be activated or deactivated, so that the problem of how to control active and inactive states of part of multiple downlink BWPs when the multiple downlink BWPs are configured on the carrier is solved.

Figure 4:
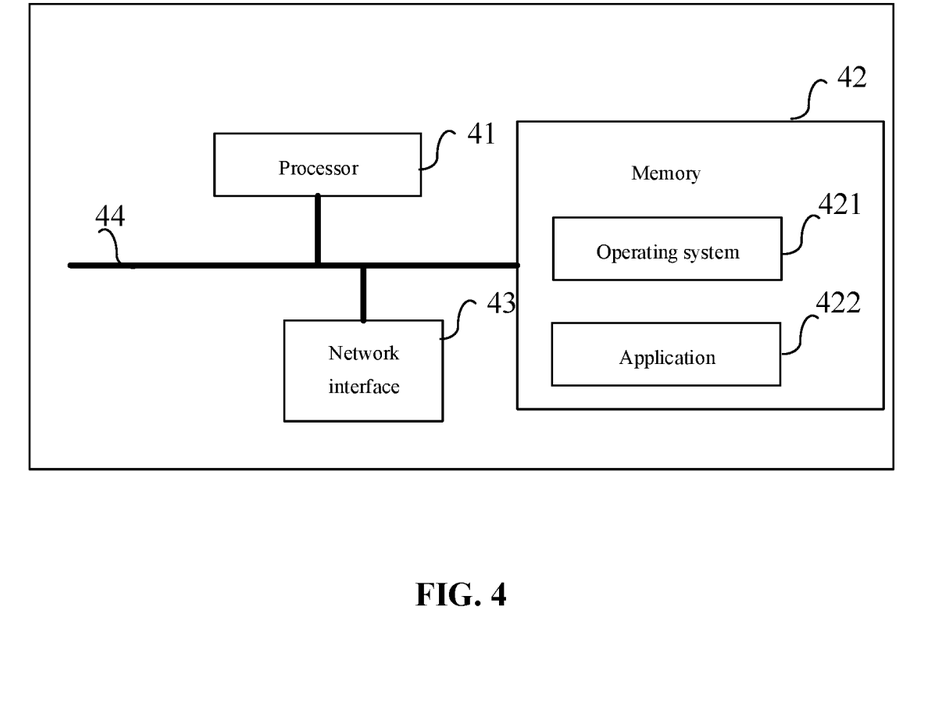
FIG. 4 is a diagram of a hardware architecture according to an embodiment of the disclosure.

An embodiment of the disclosure also provides a hardware composition architecture of a terminal device or a network device, as illustrated in FIG. 4, includes at least one processor 41, a memory 42 and at least one network interface 43. Each component is coupled together through a bus system 44. It can be understood that the bus system 44 is configured to implement connection communication between these components. The bus system 44 includes a data bus and further includes a power bus, a control bus and a state signal bus. However, for clear description, various buses in FIG. 4 are marked as the bus system 44.

It can be understood that the memory 42 in the embodiment of the disclosure may be a volatile memory or a nonvolatile memory, or may include both the volatile and nonvolatile memories.

In some implementation modes, the memory 42 stores the following elements, executable modules or data structures, or a subset thereof or an extended set thereof:

an operating system 421 and an application 422.

Herein, the processor 41 is configured to be capable of processing the operations of the method in the first or second embodiment, which will not be elaborated herein.

An embodiment of the disclosure provides a computer storage medium, which stores computer-executable instructions that, when executed, implement the operations of the method in the first or second embodiment.

When being implemented in form of software functional module and sold or used as an independent product, the devices of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes various media capable of storing program codes, such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which a computer program is stored, and the computer program is configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for downlink bandwidth part (BWP) activation and deactivation, applied to a terminal device, the method comprising:
   performing, based on control of a network device, activation and deactivation of at least one downlink BWP configured on a carrier of the terminal device;
   wherein deactivation of the at least one downlink BWP is controlled by at least one inactivity timer configured by the network device, comprises:
   acquiring the at least one inactivity timer configured by the network device for at least part of other downlink BWPs, except an initial BWP, of the at least one downlink BWP;
   starting the inactivity timer corresponding to a downlink BWP when data transmission or reception occurred on the downlink BWP;

controlling, through the inactivity timer, a duration during which the downlink BWP is kept in an active state after entering the active state; and stopping the inactivity timer when the terminal device initiates a random access procedure.

2. The method of claim 1, further comprising:

when the inactivity timer corresponding to the downlink BWP expires, controlling the downlink BWP to be switched to an inactive state; and detecting a number of downlink BWPs presently in the active state, and when the number of the downlink BWPs is 1, controlling to replace the downlink BWP presently in the active state with an initial BWP to activate the initial BWP and deactivate the downlink BWP presently in the active state.

3. A terminal device, comprising:

a processor;

a network interface; and a memory for storing computer program instructions that, when executed by the processor, cause the processor to perform, based on control of a network device, activation and deactivation of at least one downlink bandwidth part (BWP) configured on a carrier of the terminal device, wherein the processor is further configured to control deactivation of the at least one downlink BWP by at least one inactivity timer configured by the network device, which comprises:

acquiring, through the network interface, the at least one inactivity timer configured by the network device for at least part of other downlink BWPs, except an initial BWP, of the at least one downlink BWP;

starting the inactivity timer corresponding to a downlink BWP when data transmission or reception occurred on the downlink BWP;

controlling, through the inactivity timer, a duration during which the downlink BWP is kept in an active state after entering the active state; and stopping the inactivity timer when the terminal device initiates a random access procedure.

4. The terminal device of claim 3, wherein the processor is configured to: when the inactivity timer corresponding to the downlink BWP expires, control the downlink BWP to be switched to an inactive state; and detect a number of downlink BWPs presently in the active state, and when the number of the downlink BWPs is 1, control to replace the downlink BWP presently in the active state with an initial BWP to activate the initial BWP and deactivate the downlink BWP presently in the active state.

5. A non-transitory computer readable storage medium, having stored thereon instructions that, when executed by a terminal device, cause the terminal device to execute a method for downlink bandwidth part (BWP) activation and deactivation comprising:

performing, based on control of a network device, activation and deactivation of at least one downlink BWP configured on a carrier of the terminal device;

wherein deactivation of the at least one downlink BWP is controlled by at least one inactivity timer configured by the network device, comprises:

acquiring the at least one inactivity timer configured by the network device for at least part of other downlink BWPs, except an initial BWP, of the at least one downlink BWP;

starting the inactivity timer corresponding to a downlink BWP when data transmission or reception occurred on the downlink BWP; and controlling, through the inactivity timer, a duration during which the downlink BWP is kept in an active state after entering the active state; and stopping the inactivity timer when the terminal device initiates a random access procedure.

6. The non-transitory computer readable storage medium of claim 5, wherein the method further comprises:

when the inactivity timer corresponding to the downlink BWP expires, controlling the downlink BWP to be switched to an inactive state; and detecting a number of downlink BWPs presently in the active state, and when the number of the downlink BWPs is 1, controlling to replace the downlink BWP presently in the active state with an initial BWP to activate the initial BWP and deactivate the downlink BWP presently in the active state.

* * * * *